United States Patent [19]

Weltman et al.

[11] Patent Number: 5,188,754
[45] Date of Patent: Feb. 23, 1993

[54] CLEANING FORMULATION AND METHOD THAT ALLEVIATES CURRENT PROBLEMS

[75] Inventors: Henry J. Weltman; Tony L. Phillips, both of Fort Worth, Tex.

[73] Assignee: General Dynamics Corporation, Fort Worth, Tex.

[21] Appl. No.: 743,258

[22] Filed: Aug. 9, 1991

Related U.S. Application Data

[63] Continuation-in-part of Ser. No. 686,180, Apr. 16, 1991, abandoned.

[51] Int. Cl.$^5$ .......................... C09D 9/00; C11D 7/22; C11D 7/50
[52] U.S. Cl. ..................................... 252/162; 252/153; 252/170; 252/171; 252/DIG. 8; 134/38; 134/39; 134/40
[58] Field of Search ............... 252/153, 162, 170, 171, 252/172, DIG. 8; 734/38, 39, 40

[56] References Cited

U.S. PATENT DOCUMENTS 5,011,621  4/1991  Sullivan ................. 252/DIG. 8
5,015,410  5/1991  Sullivan ................. 252/DIG. 8

Primary Examiner—A. Lionel Clingman
Assistant Examiner—William S. Parks
Attorney, Agent, or Firm—Arthur F. Zobal; James C. Fails

[57] ABSTRACT

Disclosed are formulations for producing chemical solvent admixtures that can be employed to clean a surface for further work; and that can be applied to cloths for the cleaning operation yet alleviate problems with solvent evaporation into the atmosphere to cause many legal and environmental problems, and a method of storing and disposing of cloths soaked with the formulation that alleviates current problems.

19 Claims, 4 Drawing Sheets

| BAGGING MATERIAL | SOLVENT LOSS* |
|---|---|
| 4.6 MIL POLYETHYLENE | 12.1 |
| 10 MIL POLYETHYLENE | 11.0 |
| 1.1 MIL POLYOLEFIN | 7.2 |
| 4 MIL POLYPROPYLENE | 2.9 |
| 3.3 MIL VINYL COMPOSITE | 1.2 |
| 2 MIL POLYPYROPYLENE/ETHYLENE-VINYL-ALCOHOL | 0.3 |
| METALLIZED PLASTIC | 0.1 ** |

\* LOSS OVER 24 HOURS

\*\* TIED OFF (CLOSED WITH STAPLES CREATES LEAKS-INCREASES LOSS TO 1.3%)

CLEANING FORMULATION AND METHOD THAT ALLEVIATES CURRENT PROBLEMS

CROSS-REFERENCE TO RELATED APPLICATION

This Application is a continuation-in-part of application Ser. No. 07/686,180, filed Apr. 16, 1991, now abandoned, same title, same inventor and same assignee.

FIELD OF INVENTION

This invention relates to cleaning formulations and method of handling cloths soaked therewith. More particularly, it relates to a formulation or solvent that can be employed to effect good cleaning and alleviate current problems; for example, a solvent blend that can be employed to remove soils from a surface when applied to a cloth and a method of handling the solvent-laden cloths that alleviates problems experienced heretofore.

BACKGROUND OF THE INVENTION

The prior art is replete with a wide variety of different types of formulations and allusion to the problems created with their use. For example, the nearest approach of which we are aware involves wiping the surface to be cleaned with a cloth on which a solvent; such as methyl ethyl ketone; or a solvent blend, or formulation, such as methyl ethyl ketone, aromatic naptha, isopropyl alcohol, and ethyl acetate has been applied. Other solvent blends that include chlorofluorocarbons and trichloroethane are also used. The wipe cloths are then open to the atmosphere or are transferred to a metal can for temporary storage. The cloths then go through several stages of transfer and storage until they are eventually laundered, buried as a solid waste or incinerated.

Alternatively, the wiping operation is performed or the cloths stored in an enclosed area equipped with forced ventilation and a carbon absorption system. The solvent vapors from the surfaces being cleaned and from the used wipe cloths are carried into the filtration media where they are partially absorbed. Periodically the solvents are stripped from the carbon and are incinerated.

Several disadvantages are inherent in these prior art type systems and deleterious effects result therefrom. Using the first approach, the solvents evaporate rapidly from the work piece during the wiping operation and further evaporation takes place from the solvent-laden wipe cloths during storage and transfer prior to their final disposal. The emissions from certain solvents eventually reach the atmosphere where they react with other air emissions in the presence of sunlight to form ozone and/or create smog.

Alternatively, certain other solvent emissions will reach the stratosphere where they deplete the protective ozone layer, causing extensive damage to animal and plant life on earth. These solvents are primarily chlorofluorocarbons and trichloroethane. There are federal, state and local regulations that restrict volatile emissions from cleaning operations and violations can lead to severe penalties including fines, incarceration of managing personnel, and shut down of the offending facility.

Many of these solvents have been banned by federal statute. The federal statute entitled "Clean Air Act" was passed by Congress in 1990 and signed into law. This law curtails the use of such common solvent cleaners as chloroform, dichloromethane, methyl ethyl ketone, methyl isobutyl ketone, toluene, trichloroethylene, trichloroethane and xylenes. A formulation which contains none of these curtailed ingredients but which are efficient cleaners and have low flammability, low toxicity and slow evaporation rates should have wide acceptance in many industries.

The carbon absorption system for collection and disposal of wipe solvents has other disadvantages. It is expensive to install and to operate and has limited collection efficiency and capacity. Moreover, such a system is not feasible in large facilities where cleaning operations are required in widely scattered locations, but requires rather closely located areas and a central facility.

This invention overcomes these disadvantages and deleterious effects. Specifically, it is desirable that a cleaning formulation have the following features:

1. The formulation should achieve superior cleaning with a considerable reduction of volatile emissions to the atmosphere.
2. The formulation should have excellent cleaning efficiency for a wide variety of soils.
3. The cleaning formulation should have a low evaporation rate, low toxicity, and be nonflammable; for example, as demonstrated by having a flash point of 100 degrees Fahrenheit or higher when measured by the closed cup method.

In addition, the method of disposing of cloths soaked in the formulation should be adequate to keep the emissions to the atmosphere low.

SUMMARY OF THE INVENTION

The invention should provide at least one of the features described hereinbefore as desirable and not heretofore provided by the prior art.

Specifically, it is an object of this invention to provide substantially all of the advantages described hereinbefore as desirable and not heretofore provided by the prior art.

These and other objects will become apparent from the descriptive matter hereinafter, particularly when taken in conjunction with the appended drawings.

In accordance with this invention there is provided a cleaning formulation that can be applied to a cloth and employed to wipe a variety of soils from a surface on which other operations are to be performed.

In accordance with one embodiment of this invention, such a cleaning formulation is shown by a combination of a major and effective amount; for example, 98–75 percent by volume of a first ingredient comprising propylene glycol methyl ether acetate; and a minor and effective amount; for example, 2 to 25 percent by volume of a second ingredient consisting essentially of methyl isoamyl ketone.

An alternative second ingredient is 2 to 20 percent by volume of normal butyl acetate.

In accordance with another embodiment of this invention, there is provided an improved composition that has a low odor content that tends to prevent it from being objectionable to the user who cannot tolerate the relatively stronger odor of the compositions described hereinbefore.

In accordance with another embodiment, the invention will comprise at least 5 percent propylene glycol methyl ether acetate, at least 30 percent by volume of propylene glycol methyl ether, at least 10 percent by volume isoparaffins, at least 2 percent by volume normal butyl acetate and at least 2 percent by volume of d-limonene.

In accordance with another embodiment of this invention there is provided a method of disposing of cloths onto which the formulation has been applied which comprises the steps of:

1. applying the solvent into the cloth and wiping the surface;
2. sealing the solvent-laden cloth in a vapor-proof bag;
3. storing the vapor-proof bag and solvent laden cloth in an enclosed collection can;
4. storing in covered bins in a lined transfer bag the vapor-proof bags and solvent-laden cloths that have been dumped thereinto;
5. compacting the sealed bags containing the solvent-laden cloths into steel or fibre drums; and
6. disposing of the compacted sealed bags and contents.

As an example, the respective bags may be combustible and the entire bags and solvent-laden cloths burned in an incinerator to produce harmless gaseous emissions.

DESCRIPTION OF PREFERRED EMBODIMENTS

Figures 1, 3:
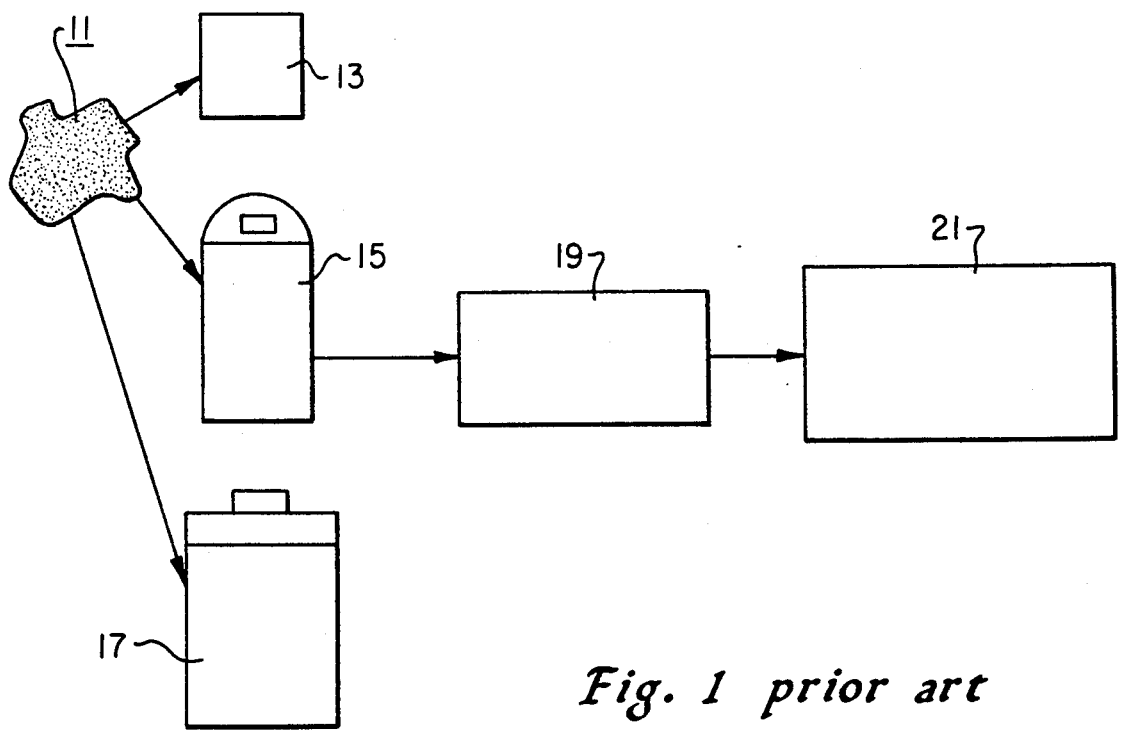
FIG. 1 represents a prior art collection system.
FIG. 3 shows a solvent permeability of bagging material in which the loss over 24 hours is given.

It should be borne in mind that this invention may be useful in multiple areas. The specific instance in which it has been employed most zealously has been in the attempts to upgrade the wiping of surfaces for elimination of various "soils" to form light-weight but strong components for making aircraft parts or the like. Accordingly, it is in this environment that this invention will be described most closely hereinafter.

In this invention, the chemicals are listed in the Condensed Chemical Dictionary, 11th Ed., Van Nostrand Reinhold, N.Y., 1987. No statement was found therein of the chemicals of this invention being used as cleaning chemicals.

An important consideration in selecting the components in the blend was the volatility, or evaporation rate. If the volatility was too low, the cleaner would not dry off the surface being cleaned. On the other hand, if the volatility was too high, an excessive amount evaporated to the atmosphere, creating atmospheric contamination. The ideal evaporation rate was found to be between 30 and 100 percent of the evaporation rate of n-butyl acetate which is used as a reference to define evaporation rates of liquids.

A typical example of a major ingredient is propylene glycol methyl ether acetate, having a structural formula I, $C_6H_{12}O_3$, as follows:

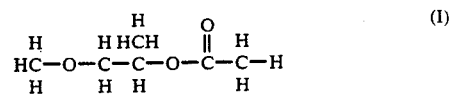

It is projected that other glycol ethers or glycol ether acetates can be used instead of propylene glycol methyl ether acetate, but such modification would alter the evaporation rate and other critical properties.

In this invention, a propylene glycol methyl ether acetate should have a flash point no lower than 116 degrees Fahrenheit if it is desired that the material be nonflammable, or have a flash point above 100 degrees Fahrenheit as measured by the closed cup method. Similarly, the propylene glycol methyl ether should have a flash point no lower than 89 degrees Fahrenheit if compositions of this invention are to be nonflammable, or have a flash point above 100 degrees Fahrenheit as measured by the closed cup method. If the lower flash points can be tolerated, even greater quantities of impurities are acceptable so as to lower the flash point. This is not normally desirable in most of the cleaning applications in which we have tried the formulation of this invention. Care must be taken that any alteration does not exceed the limits set forth in accordance with this formulation; specifically, the flash point of the formulation, if it is to be nonflammable must be 100 degrees Fahrenheit or higher when measured by the closed cup method.

It has been found advantageous to have a formulation that has sufficiently low toxicity, reported as Threshold Limit Value—Time Weighted Average toxicity, (TLV-TWA toxicity). This is sometimes variously referred to only as "TLV" or "TWA" (toxicity). It must be low enough to allow eight hours continuous human exposure to at least 100 ppm without ill effects.

The Threshold Limit Value—Time Weighted Average (TLV-TWA) is the time-weighted average concentration for a normal eight hour workday and a forty hour workweek, to which nearly all workers may be repeatedly exposed, day after day, without adverse effect. It is expressed in the reference as parts per million (ppm) which is parts of vapor or gas per million parts of contaminated air by volume at 25 degrees C and 760 torr.

The optimum result has been found to be where only about 2 percent by volume of a total amount of the formulation is the second ingredient with the proportion of the first and major ingredient being about 98 percent by volume of the first and second ingredients comprising the formulation. In optimum formulations, our formulation has been found to be able to provide a TLV-TWA toxicity well above 200 parts per million, since the major ingredient has no established TLV toxicity. Even higher TLV toxicity values can be obtained; for example, TLV-TWA value up to about 1000 parts per million. As a consequence, the optimum formulation has extremely low toxicity, or recognized high TLV-TWA toxicity value.

Table I hereinafter lists the properties of some typical glycol ethers and glycol ether acetates It can be seen that propylene glycol methyl ether is slightly too flammable since its flash point is only 97 degrees Fahrenheit.

On the other hand, ethylene glycol methyl ether is too toxic, since its maximum exposure limit is only 25 ppm. In like manner, ethylene glycol butyl ether is too toxic, since its maximum exposure limit is only 50 ppm.

Ethylene glycol ethyl ether, ethylene glycol ethyl ether acetate, and diethylene glycol methyl ether each evaporate too slowly.

Herein when the specific chemical is described, the allusion is to that chemical alone without being significantly modified by the presence of other ingredients.

TABLE I

PROPERTIES OF GLYCOL ETHERS AND GLYCOL ETHER ACETATES

| COMPOUND | EVAPORATION RATE (based on n-Butyl Acetate = 1) | FLAMMABILITY (Flash Pt., Deg. F.) | TLV-TWA TOXICITY (Max Exposure Limit, PPM) |
|---|---|---|---|
| 1) ETHYLENE GLYCOL METHYL ETHER | 0.5 | 110 | 25 |
| 2) ETHYLENE GLYCOL ETHYL ETHER | 0.3 | 120 | 100 |
| 3) ETHYLENE GLYCOL ETHYL ETHER ACETATE | 0.2 | 120 | 100 |
| 4) ETHYLENE GLYCOL BUTYL ETHER | 0.06 | 190 | 50 |
| 5) DIETHYLENE GLYCOL METHYL ETHER | 0.02 | 200 | NONE ESTABLISHED |
| 6) PROPYLENE GLYCOL METHYL ETHER | 0.7 | 97 | 100 |
| 7) PROPYLENE GLYCOL METHYL ETHER ACETATE | 0.4 | 116 | NON ESTABLISHED |

Deg. = Degrees
Pt. = point
Max = maximum

There are several other compounds in this family of chemicals as shown in the Condensed Chemical Dictionary, 11th Ed., but they do not exhibit the optimum chemical and physical properties as does the major ingredient delineated herein.

Similarly, other ketones or aliphatic esters could be used instead of the methyl isoamyl ketone or n-butyl acetate but such substitution may alter the evaporation rate, toxicity and flammability. Care must be taken that the alteration is not intolerably great.

Table II shows the properties of several ketones and aliphatic esters compared with the ones described in this invention.

Herein when the specific chemical is described, the allusion is to that chemical alone without being significantly modified by the presence of other ingredients.

TABLE II

| COMPOUND | EVAPORATION RATE (based on n-butyl Acetate = 1) | FLAMMABILITY (Flash Pt., Deg. F.) | TLV-TWA TOXICITY (Max Exposure Limit, PPM) |
|---|---|---|---|
| KETONES | | | |
| 1) METHYL ETHYL KETONE | 3.8 | 24 | 200 |
| 2) METHYL PROPYL KETONE | 2.3 | 45 | 200 |
| 3) METHYL ISOBUTYL KETONE | 1.6 | 73 | 100 |
| 4) METHYL HEXYL KETONE | .1 | 160 | 100 |
| 5) METHYL ISOAMYL KETONE | 0.5 | 96 | 100 |
| ALIPHATIC ESTERS | | | |
| 6) ETHYL ACETATE | 4.1 | 24 | 200 |
| 7) PROPYL ACETATE | 2.3 | 55 | 200 |
| 8) AMYL ACETATE | 0.4 | 101 | 200 |
| 9) N-BUTYL ACETATE | 1.0 | 72 | 150 |

Deg. = Degrees
Max = maximum
Pt. = point

The methyl ethyl ketone and the methyl propyl ketone have a higher evaporation rate than desired. In addition, they are too flammable in that their flash point is down to about 24 to 45 degrees F. These components would lower the flash point of the formulation to under 100 degrees Fahrenheit.

Methyl isobutyl ketone also evaporates too rapidly. Methyl hexyl ketone has too low an evaporation rate. The methyl isoamyl ketone is about the optimum ketone compound.

The methyl isoamyl ketone has about the optimum vapor pressure and by virtue of its slow evaporation it is relatively non-toxic.

An alternative minor component is n-butyl acetate, an aliphatic ester. This compound was selected from a list of aliphatic esters shown in Table II based on their physical and chemical properties. Ethyl acetate and propyl acetate evaporate too rapidly and their flash points are too low. Amyl acetate has a satisfactory evaporation rate and flash point, but has a strong odor even when diluted to 5 percent by volume. The n-butyl acetate has a relatively low flash point, but it does not lower the flash point of the total formulation to under 100 degrees Fahrenheit when mixed at 5 to 20 percent by volume.

An odor masking ingredient is frequently employed. Typical of an odor masking ingredient is a concentration within the range of a trace up to 5.0 percent by volume of d-limonene, a $C_{10}H_{16}$ cyclic hydrocarbon.

Although there are several blends of cleaning formulations on the market, none of these combinations exhibit the efficiency and have the scientific approach employed in this invention.

The formulation can clean surfaces in preparation for applying sealants, adhesives, paints and can effectively clean machinery, automobiles, structures such as walls or floors or even the light weight parts for aircraft. It can be used inside buildings and in non-ventilated areas with no danger of fire or toxicity.

The formulation can be employed to clean a variety of different kinds of soil such as oils, greases, waxes, uncured resins, dirt, stains, carbon, marking inks, wet paints and others. In this way the surface is made ready for further work as indicated in the preceding paragraph.

An improved formulation is shown in Table III:

TABLE III

|  | OPTIMUM CONCENTRATION (Percentage) | ALLOWABLE RANGE (Percenetage) |
| --- | --- | --- |
| PROPYLENE GLYCOL METHYL ETHER ACETATE | 25 | 5-35 |
| PROPYLENE GLYCOL METHYL ETHER | 40 | 30-60 |
| ISOPARAFFINS (ISO-DECANE AND ISO-UNDECANE IN ANY PROPORTION) | 28 | 10-33 |
| NORMAL BUTYL ACETATE | 5 | 2-33 |
| D-LIMONENE | 2 | trace-5 |

The percentages given herein are percent by volume.

The ranges given in Table III have been formulated based on laboratory tests. For example, it has been found that the combined concentrations of propylene glycol methyl acetate and propylene glycol methyl ether must be at least 65 percent in order for the formulation to have a satisfactory cleaning efficiency. At least 5 percent of this total must be propylene glycol methyl ether acetate to reduce the flammability. The concentration of propylene glycol methyl ether acetate is also limited by its odor, 35 percent being the maximum desirable. These findings then set the range of propylene glycol methyl ether acetate at 5 to 35 percent and the range of propylene glycol methyl ether at 30 to 60 percent. In the case of normal butyl acetate, it has been found that at least 2 percent is needed to clean certain types of soils, particularly marking inks. On the other hand if more than 15 percent is added, the flash point is lowered to the point where the formulation becomes too flammable. The isoparaffins, specifically iso-decane and iso-undecane, increase the flash point of the formulation which is desirable. If, on the other hand, 65 percent is the minimum concentration of the two glycol ethers and 2 percent is the minimum concentration of the butyl acetate, the maximum concentration of the isoparaffins becomes 33 percent. The d-limonene is added to improve the odor. If more than 5 percent is added, the citrus odor becomes too strong.

Table IV compares the properties of the new improved formulations with those of the formulation described in the earlier filed application of which this is a continuation-in-part. Table IV shows that the improved formulation is an efficient cleaner, has a low toxicity, is nonflammable at ambient temperatures up to 91 degrees Fahrenheit, has a low vapor pressure and low evaporation rate to reduce volatile organic compound emissions so it can be used with the wipe cloth management system as described hereinafter in subject invention to further reduce emissions. The improved formulation evaporates from surfaces at ambient conditions leaving no residue. It conforms to government environmental regulations and has a mild, pleasant odor. The new formulation has a wide application in industry where odors associated with formulations such as the strong odors given hereinbefore may be objectionable.

TABLE IV

| COMPARISON OF PROPERTIES OF ORIGINAL AND NEW FORMULATIONS | | |
| --- | --- | --- |
|  | Original Formulation (From Pending Patent) | New Formulation |
| Cleaning efficiency | Excellent | Good |
| Flash Point deg. Fahrenheit | 110 | 91-101 |
| Toxicity, TLV-TWA (max. exposure limits) | 400 | 150 |
| Odor | Strong | Mild |
| Vapor pressure (mm mercury @ 20 degrees C.) | 4.5 | 6.4 |
| Evaporation rate (n-butyl acetate = 100) | 30 | 50 |
| Compatible with wipe cloth management system per pending patent) | Yes | Yes |

The new formulations described immediately hereinbefore have certain properties which may make them less desirable than the original formulation; for example, they may be more flammable or more toxic. About 50 percent of the workers may be bothered by the odor of the older formulation. All the original and the new formulations are increasingly in demand as a result of a Clean Air Act passed by Congress in 1990. As indicated hereinbefore, this law curtails the use of some common solvent cleaners such as chloroform, dicloromethane, methyl ethyl ketone, methyl isobutyl ketone, toluene, trichloroethylene, trichloroethane, and xylenes. A formulation which contains none of these curtailed ingredients but which is an efficient cleaner, nonflammable, and has low toxicity and evaporates slowly leaving no residue is desirable. This is particularly true where it has a pleasant odor that will have wide acceptance in the manufacturing industries. Where it is desired to eliminate any problem with flammability, formulations have been developed which contain a higher portion of higher flash point ingredients and a lower portion of low flash point ingredients. For example, propylene glycol methyl ether acetate has a flash point of 117 degrees Fahrenheit. By increasing the concentration of this component to 55 to 75 percent (% by vol.) level as opposed to 25 percent in the flammable formulation, the flash point of the admixture is increased. On the other hand, propylene glycol methyl ether has a flash point as low as 89 degrees (although some batches are as high as 98 degrees). The flash point of the admixture is lower when the concentration of the lower flash point ingredient is kept low. Care must be taken to maintain a combination of the two ingredients mentioned above to at least 65 percent of the total formulation to maintain cleaning efficiency.

There are a large number of variations of the formulation available. If too much propylene glycol methyl ether acetate (PMA) is added, the odor becomes too strong. If too little PMA is added, the cleaning efficiency is reduced. If too much propylene glycol methyl ether is added, the flammability is increased. This is frequently intolerable. The proportion of propylene glycol methyl ether must be decreased. If too little propylene glycol methyl ether is included, however, the cleaning efficiency is reduced. If too much isoparaffins are added, the cleaning efficiency is reduced; if too little, the other components must be increased to undesirable levels. N-butyl acetate is included in some of the formulations to help clean certain types of inks and dyes. If too much n-butyl acetate is present the formulation smells too "fruity" and the flash point is reduced. If this is intolerable, then the proportion of n-butyl acetate must be decreased.

Further details of the new formulation are shown in Table V. These formulations differ from each other, each having specific advantages. Formulation A is the least flammable and the least toxic and has the lowest vapor pressure and evaporation rate. Formulation B has the mildest odor of the three formulations. Formulation C is the best cleaner, being composed of two components having good cleaning efficiencies.

Table VI along with a comparison of the formulations and properties of earlier formulations that I have developed, show the advantages and the industrial applications in terms of cleaning efficiency, flash point, toxicity, odor, vapor pressure, evaporation rate and the like.

TABLE V

NONFLAMMABLE, MODERATE ODOR CLEANING FORMULATIONS

| | Formulations | | | | | |
|---|---|---|---|---|---|---|
| | A | | B | | C | |
| Ingredients | All. Range | Opt. Conc. | All. Range | Opt. Conc. | All. Range | Opt. Conc. |
| Propylene Glycol Methyl Ether Acetate (PMA) | 65-75 | 65 | 55-75 | 55 | 60-75 | 60 |
| Propylene Glycol Methyl Ether (PM) | | | 5-10 | 10 | 25-40 | 40 |
| Isoparaffins (C11, C12) | 25-30 | 30 | 25-33 | 33 | | |
| Butyl Acetate | 2-5 | 5 | 2-5 | 2 | | |

Concentrations are % by volume
Conc. = Concentration
Opt. = optimum
All. = allowable

TABLE VI

COMPARISON OF PRIOR AND NEW FORMULATIONS

| | SERIAL NO. 07/614,228 | SERIAL NO. 07/686,180 | New Formulations | | |
|---|---|---|---|---|---|
| | | | A | B | C |
| INGREDIENTS | | | | | |
| Propylene Glycol Methyl Ether Acetate (PMA) | 67-98 | 67-98 | 5-35 | 65 | 55 | 60 |
| Propylene Glycol Methyl Ether (PM) | | | 30-60 | | 10 | 40 |
| Isoparaffins | | | 10-33 (C10, C11) | 30 (C11, C12) | 33 (C11, C12) | |
| Butyl Acetate | 2-33 | | 2-33 | 5 | 2 | |
| Methyl Isoamyl Ketone | | 2-33 | | | | |
| d-Limonene | 0-5 | 0-5 | | | | |
| PROPERTIES | | | | | | |
| Cleaning Efficiency | Excell | | Good | Good | Good | Excell |
| Flash Point Degrees Fahrenheit | 110 | 112 | 91 | 105 | 101 | 101 |
| Toxicity, TLV-TWA | 400 | 400 | 150 | 300 | 200 | 150 |
| Odor | Strong | Strong | Mild | Mod. | Mod. | Mod. |
| Vapor Pressure mm Hg | 5.0 | 4.3 | 6.4 | 3.5 | 4.0 | 6.6 |
| Evaporation rate (butyl acetate = 100) | 30 | 30 | 50 | 28 | 29 | 46 |
| Evaporate at Ambient Temp. | Yes | Yes | Yes | Yes | Yes | Yes |
| Residue after Evaporation | None | None | None | None | None | None |
| Curtailed Chemicals | None | None | None | None | None | None |
| Use with Wipe-Cloth Management System | Yes | Yes | Yes | Yes | Yes | Yes |

Isoparaffins are iso-form
*Concentrations are shown as % by volume
Mod. = Moderate
Excell = Excellent Another aspect of this invention is the use of the vapor-proof bags to store the solvent-laden cloths. These bags may be constructed of metal foil such as 2 mil thick aluminum; plastics, such as polyethylene, mylar, vinyl, or others; or of a metallized-plastic composite. Metal foils effectively prevent diffusion and evaporation of the solvents, but tear easily and are difficult to form into bags. Plastics vary in their ability to prevent diffusion of solvents. Vinyl and polypropylene are more effective than polyethylene. Metallized-plastic composites are the preferred composition as they allow very low diffusion of solvents and are tear resistant and easy to manufacture into the desired shapes. Although vapor-proof bags have been used to store certain food products such as potato chips, their use for storing used solvent-laden wipe cloths is not known to the inventors. It is also a novel procedure to enclose used wipe cloths in vapor-proof bags. Using existent procedures, the used wipe cloths are either left open to the atmosphere now or placed in containers that do not effectively prevent volatile emissions. This embodiment of this invention prevents such volatile emissions.

Specifically, the method of this invention provides a vapor-proof enclosure for storage, eliminates the bulk of cloth filled bags for handling transfer to the incinerator and reduces the cost of transportation and disposal of the cloths. In fact, the combination of the formulation and the method of this invention results in a reduction of the volatile organic emissions in the range of 60 to 96 percent as compared with existing, or prior art, procedures. This invention also overcomes the disadvantages of the carbon absorption system, since the cleaning operation can be performed anywhere in the facility rather than being limited to rooms equipped with a carbon absorption system. In addition, the efficiency of the invention reduces the emissions to 4 to 40 percent of the prior art emissions. Initial costs and maintenance costs are also reduced.

Figure 2:
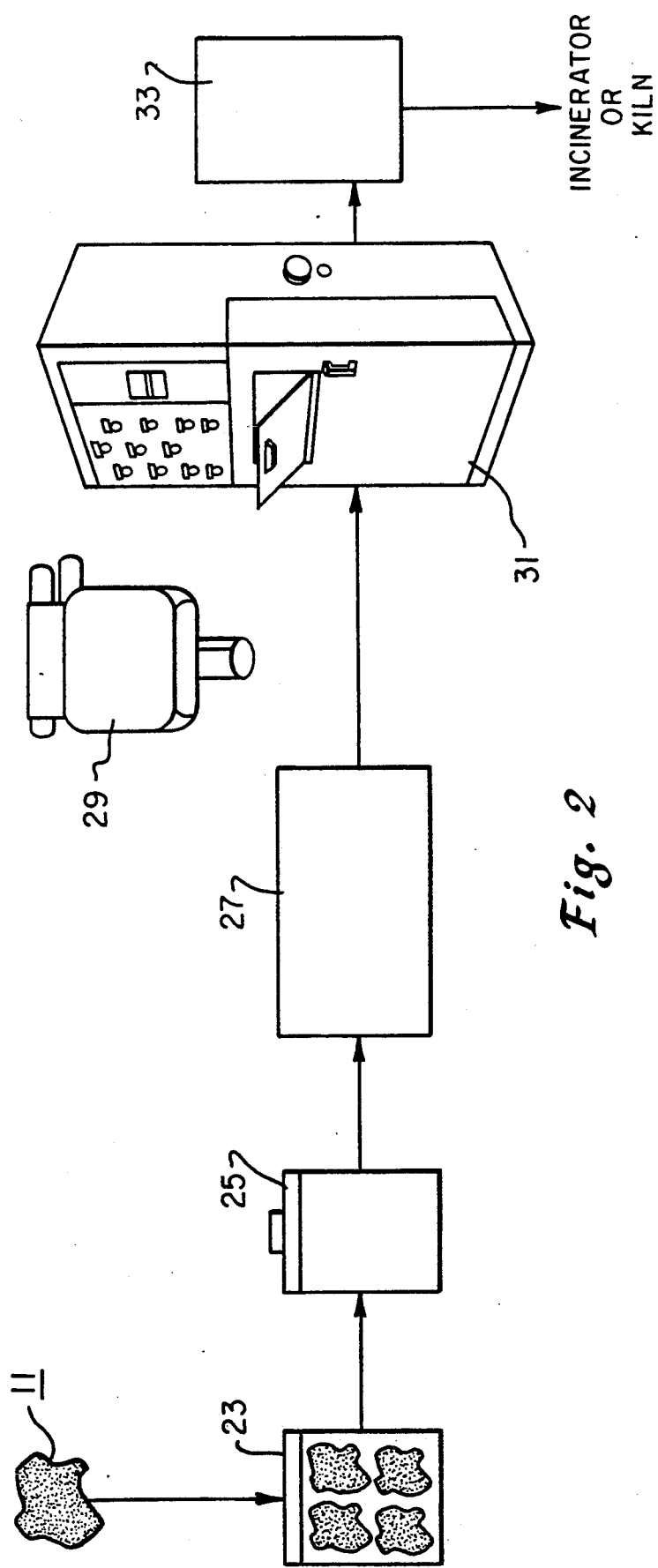
FIG. 2 represents a proposed collection system.

Referring to FIG. 1, there is illustrated a diagram of the prior art type of approach in which the wipe-solvent soaked cloth 11 employed in respective small 13 or large 15 storage containers; or collection cans 17. After that they are transferred to covered, two cubic yard bins 19 and then dumped in a 30 foot roll top hopper 21 that may be used to transport them to an incinerator or landfill. By way of contrast, the proposed collection system of FIGS. 2 and 2b show the solvent-laden cloths 11 being sealed in vapor-proof bags 23, collected in collection cans 25, and stored in 2 cubic yard bins 27, each lined with a transfer bag 29 having an opening 29a for receiving the bags 23. The transfer bag is then used to carry the bags to a compactor 31, which compacts the sealed bags into steel or fibre drums 33. The compacted material is then burned in an incinerator or cement kiln.

Figure 2A:
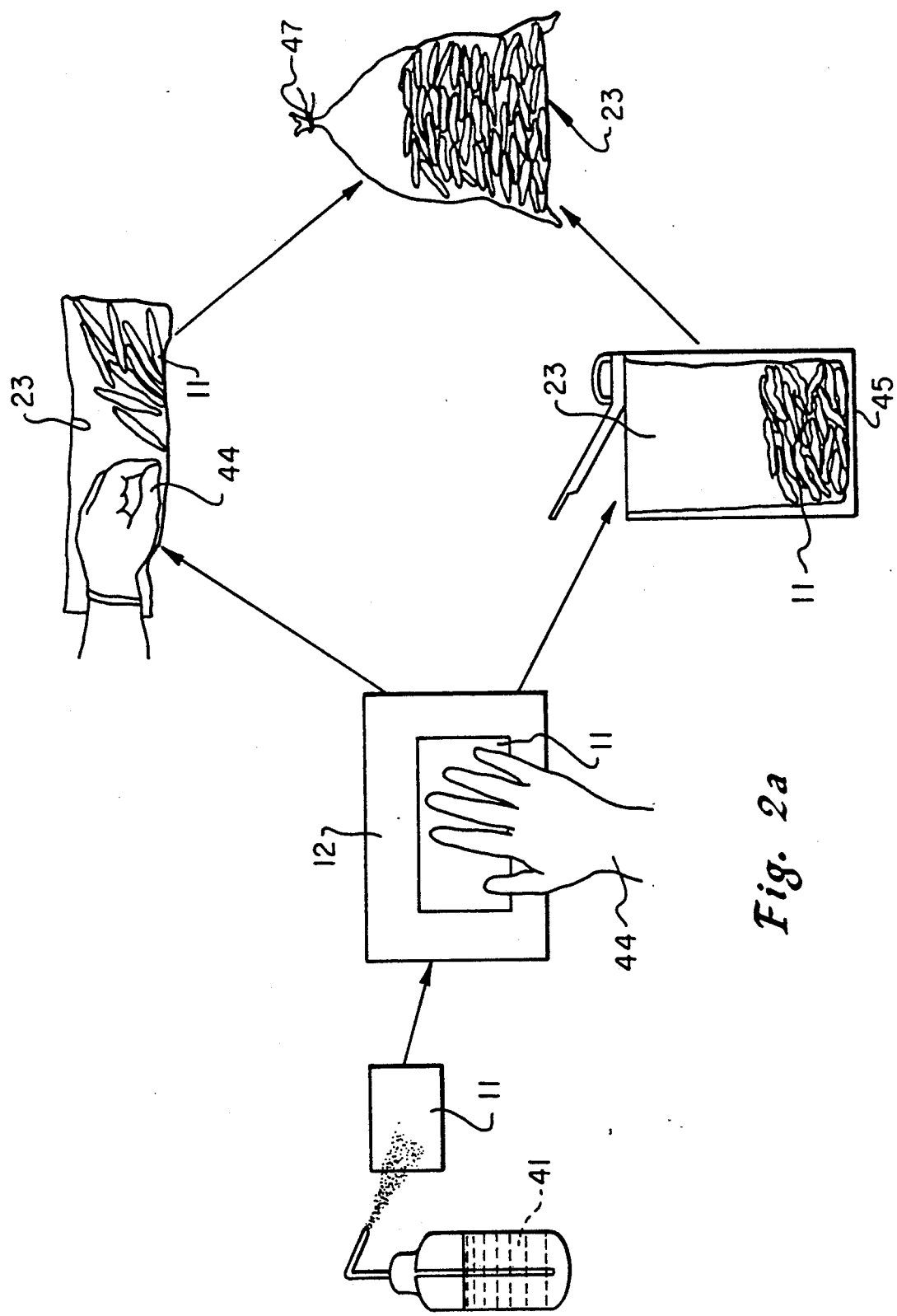
FIG. 2a shows respective steps in the proposed collection system in somewhat greater detail.
Figure 2B:
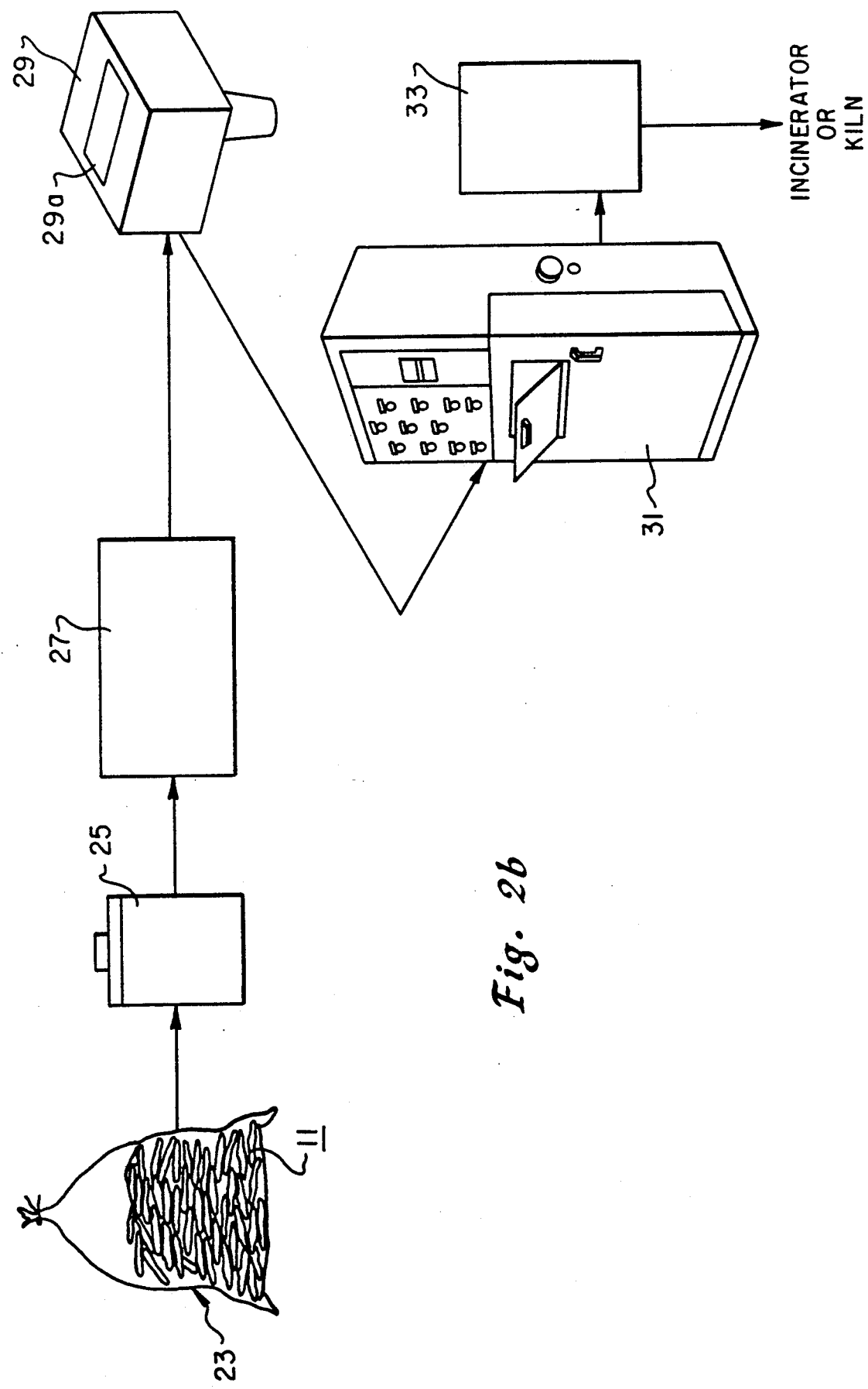
FIG. 2b shows further details of the disposal of the solvent-laden rags.

The specific steps are illustrated in more detail in FIG. 2a. Therein, the formulation is applied from a container 41 onto a cloth 11. Thereafter, the cloth 11 is employed for wiping of a workpiece 12. Suitable gloves 44 can be employed if desired. As illustrated further in FIGS. 2a or 2b, the respective cloth 11 can be placed in a stand alone vapor-proof bag 23 or in a rag can 45 which is lined with a vapor-proof bag 23. The vapor-proof bags 23 are then tied, as by a tie 47, FIG. 2a, to prevent emissions.

As shown in FIG. 2b, the sealed bags 23 containing the solvent-laden cloths 11 may be collected in 5 to 30 gallon collection cans 25. The bags are then stored in 2 cubic yard covered bins 27 which are lined with a transfer bag 29. The transfer bag 29 is employed to carry the sealed bags 23 to compactor 31, where the sealed bags 23 containing the solvent-laden cloths 11 are compacted into steel or fibre drums 33. The drums 33 are equipped with gaskets to prevent leakage of vapors. The drums are then sent to the incinerator or kiln for burning.

A comparison of solvent permeability of bagging materials is shown in FIG. 3. The solvent loss in metallized plastic bags was 0.1 percent over a 24 hour period, whereas the loss in plastic bags ranged up to 12.1 percent.

It is helpful to look at a detailed description. Referring to FIG. 1, a cleaner was employed in the old system and can be improved by the formulation of this invention. Specifically, a wiping operation can be employed using the formulation of this invention on clean wipe cloths stored in vapor-proof bags.

The sealed bags 23 are collected in the collection cans 25, transferred periodically to a storage bin 27 and then compacted into steel or fibre drums 33 by the compactor 31. The steel or fiber drums may be sealed by a gasketed lid and the assembly is designed to prevent escape of vapors and volatile emissions. The drums can be subsequently incinerated which converts the drums and contents to harmless combustion products.

As described herein the minimum air polluting wipe-solvent cleaning system is a significant improvement over the prior art type cleaning systems. Specifically, the complete system is a unique solvent formulation and wipecloth handling system having bags of unique design and materials to accomplish the purpose of providing effective cleaning but with a minimum of harmful emissions to the atmosphere. Proper use of these materials result in only 4 to 40 percent of the volatile emissions that have occurred heretofore in the prior art.

Specifically, the composition and processes described herein have relatively large commercial application and can be employed in a wide variety of industries.

The method of this invention can be employed with substantially any formulation. In particular, the formulation disclosed herein is liquid and can be employed in the method of this invention without substantial modification.

Although this invention has been described with a certain degree of particularity, it is understood that the present disclosure is made only by way of example and that numerous changes in the details of construction and the combination and arrangement of parts may be resorted to without departing from the spirit and the scope of the invention, reference being had for the latter purpose to the appended claims.

What is claimed is:

1. A non-aqueous cleaning formulation for applying on a rag for removal of dirt constituents without aggravating problems of smog, ozone layer depletion and the like comprising:
   a. A major and effective amount of propylene glycol methyl ether acetate present in a first proportion comprising a major portion of the formulation; and
   b. a minor and effective amount of at least one second ingredient in a second proportion of no more than 40 percent by volume of the volume of the formulation, said second ingredient being selected from the group consisting of propylene glycol methyl ether, methyl isoamyl ketone, isoparaffins, and n-butyl acetate; said formulation having a solvent capability for the soil to be removed; and having a TLV-TWA toxicity of at least 100 parts per million exposure limit.

2. The formulation of claim 1 wherein said second proportion of said formulation is about five percent by volume and wherein said major, or first proportion is about 95 percent of said formulation comprising the major and minor ingredients; wherein the TLV-TWA toxicity is well above 200.

3. The cleaning formulation of claim 1 wherein said first ingredient is propylene glycol methyl ether acetate and said second ingredient is methyl isoamyl ketone.

4. The formulation of claim 3 wherein said propylene glycol methyl ether acetate is present in a concentration in a range of 75-95% by volume and said methyl isoamyl ketone is present in a concentration in the range of 5-25 percent by volume.

5. The cleaning formulation of claim 1 wherein said first ingredient is propylene glycol methyl ether acetate and said second ingredient is n-butyl acetate.

6. The formulation of claim 5 wherein said propylene glycol methyl ether acetate is present in a concentration in a range of 80-95 percent by volume and said n-butyl acetate is present in a concentration in the range of 5-20 percent by volume.

7. The formulation of claim 1 wherein said propylene glycol methyl ether acetate is present in a concentration in a range of 55-75 percent by volume.

8. The cleaning formulation of claim 7 wherein said propylene glycol methyl ether is present in a concentration in a range of 5-40 percent by volume.

9. The cleaning formulation of claim 8 wherein said isoparaffins comprise undecane and dodecane and are present in a concentration in the range of 1-33 percent by volume.

10. The cleaning formulation of claim 8 wherein said isoparaffins comprise undecane and dodecane and are present in a concentration in the range of 25-33 percent by volume.

11. The cleaning formulation of claim 9 wherein normal butyl acetate is included in at least 2 percent by volume.

12. The cleaning formulation of claim 1 wherein there is also included a tract to 5 percent by volume of d-limonene as an odor mask.

13. The cleaning formulation of claim 1 wherein said propylene glycol methyl ether acetate is present in a concentration of 65-75 percent by volume; wherein said isoparaffins are selected from the group consisting of undecane and dodecane and are present in a concentration of 25-30 percent by volume and wherein said butyl acetate is present in a concentration of 2-5 percent by volume.

14. The cleaning formulation of claim 13 wherein said propylene glycol methyl ether acetate is present in a concentration of about 65 percent by volume; wherein said isoparaffins are present in a concentration of about 30 percent by volume; and wherein said butyl acetate is present in a concentration of about 5 percent by volume.

15. The cleaning formulation of claim 1 wherein said propylene glycol methyl ether acetate is present in a concentration of 55-75 percent by volume; wherein said propylene glycol methyl ether is present in a concentration of 5-10 percent by volume; wherein said isoparaffins are selected from the group consisting of undecane and dodecane and are present in a concentration of 25-33 percent by volume and wherein said butyl acetate is present in a concentration of 2-5 percent by volume.

16. The cleaning formulation of claim 15 wherein said propylene glycol methyl ether acetate is present in a concentration of about 55 percent by volume; wherein said propylene glycol methyl ether is present in a concentration of about 10 percent by volume; wherein said isoparaffins are present in a concentration of about 33 percent by volume; and wherein said butyl acetate is present in a concentration of about 2 percent by volume.

17. The cleaning formulation of claim 1 wherein said propylene glycol methyl ether acetate is present in a concentration of 60-75 percent by volume; and wherein said propylene glycol methyl ether is present in a concentration of 25-40 percent by volume.

18. A non-aqueous cleaning formulation comprising:
a major and effective amount of propylene glycol methyl ether acetate present in a concentration of at least 55% by volume of the formulation, and
a minor and effective amount of at least one second ingredient selected from the group consisting a propylene glycol methyl ether, methyl isoamyl ketone, isoparaffins, and n-butyl acetate; said formulation having a solvent capability for the soil to be removed; and having a TLV-TWA toxicity of at least 100 parts per million exposure limit.

19. A non-aqueous cleaning formulation comprising:
a major and effective amount of propylene glycol methyl ether acetate present in a concentration of at least 55% by volume of the formulation, and
a minor and effective amount of at least one second ingredient in a second proportion of no more than 40% by volume of the volume of the formulation, and said second ingredient being selected from the group consisting a propylene glycol methyl ether, methyl isoamyl ketone, isoparaffins, and n-butyl acetate; said formulation having a solvent capability for the soil to be removed; and having a TLV-TWA toxicity of at least 100 parts per million exposure limit.

* * * * *

UNITED STATES PATENT AND TRADEMARK OFFICE
CERTIFICATE OF CORRECTION

PATENT NO. : 5,188,754
DATED : February 23, 1993
INVENTOR(S) : Henry J. Weltman; Tony L. Phillips It is certified that error appears in the above-indentified patent and that said Letters Patent is hereby corrected as shown below:

Column 13, line 32 (Claim 12)
"tract" should be changed to --trace--.

Column 14, add the following Claim 20.

20. The cleaning formulation of claim 17 wherein said propylene glycol methyl ether acetate is present in a concentration of about 60 percent by volume; and wherein said propylene glycol methyl ether is present in a concentration of about 40 percent by volume.

Signed and Sealed this

Twenty-second Day of November, 1994

Attest:

BRUCE LEHMAN

Attesting Officer

Commissioner of Patents and Trademarks